(12) United States Patent
Saito

(10) Patent No.: US 7,791,474 B2
(45) Date of Patent: Sep. 7, 2010

(54) IMAGE PROCESSING APPARATUS, IMAGE PROCESSING METHOD AND COMPUTER READABLE MEDIUM

(75) Inventor: Teruka Saito, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 389 days.

(21) Appl. No.: 11/858,928

(22) Filed: Sep. 21, 2007

(65) Prior Publication Data

US 2008/0204226 A1    Aug. 28, 2008

(30) Foreign Application Priority Data

Feb. 23, 2007    (JP)    ............... 2007-043768

(51) Int. Cl.
*G08B 21/00*    (2006.01)
(52) U.S. Cl. .................... 340/540; 455/404.1
(58) Field of Classification Search ............ 340/539.25, 340/539.26, 539.28, 601, 690, 286.05, 286.06, 340/286.13, 286.14, 531, 540; 455/404.1, 455/404.2, 414.1; 379/218.01
See application file for complete search history.

(56) References Cited

U.S. PATENT DOCUMENTS

| 6,914,525 B2 * | 7/2005 | Rao et al. ................... 340/531 |
| 7,174,150 B2 * | 2/2007 | Shida ...................... 455/404.1 |
| 2008/0275308 A1 * | 11/2008 | Moore ........................ 600/300 |

FOREIGN PATENT DOCUMENTS

| JP | 2005-005884 | 1/2005 |
| JP | 2005-217622 | 8/2005 |

* cited by examiner

*Primary Examiner*—Van T. Trieu
(74) *Attorney, Agent, or Firm*—Sughrue Mion, PLLC

(57) ABSTRACT

The image processing apparatus is provided with: a geographic information holding unit that holds geographic information on an installation place where the image processing apparatus is installed; a form generation unit that generates an information registration form describing items for registering information on a disaster to be collected based on the geographic information held in the geographic information holding unit; and an output unit that outputs the information registration form generated by the form generation unit.

13 Claims, 14 Drawing Sheets

FIG.10
REGISTRATION FORM OF DAMAGE INFORMATION 
1, NAME OF PERSON WHO FILLES IN THIS FORM:
2, ADDRESS: _____ , XX TOWN, XX WARD, TOKYO
3, TYPE OF DAMAGE:
☐ TSUNAMI   ☐ SUBSIDENCE   ☐ FIRE IN TANK
☐ FIRE IN PLANT   ☐ DERAILMENT
4, PLACE OF DAMAGE (CIRCLE PLACE OF DAMAGE)
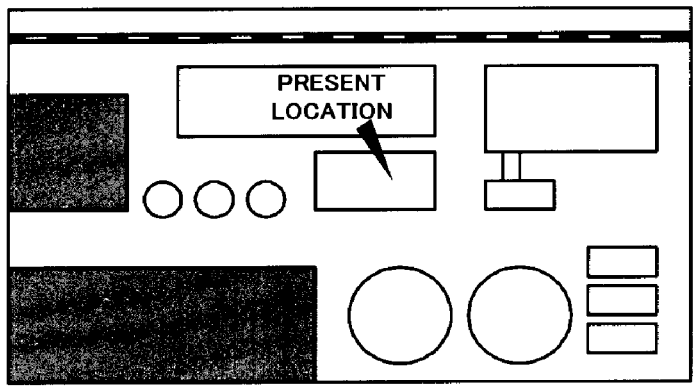
5, MISCELLANEOUS NOTES (MESSAGE)

IMAGE PROCESSING APPARATUS, IMAGE PROCESSING METHOD AND COMPUTER READABLE MEDIUM

CROSS-REFERENCE TO RELATED APPLICATION

This application is based on and claims priority under 35 USC §119 from Japanese Patent Application No. 2007-43768 filed Feb. 23, 2007.

BACKGROUND

1. Technical Field

The present invention relates to an image processing apparatus, an image processing method and a computer readable medium storing a program causing a computer to execute a process for image processing.

2. Related Art

In recent years, risk management for a disaster has been strongly required. In particular, in a large-scale disaster such as an earthquake, a wind and flood disaster or a volcanic disaster, it is important to immediately check the safety of residents or the like in a disaster-stricken area. Services and systems supporting risk management for a disaster have been proposed and provided.

SUMMARY

According to an aspect of the invention, there is provided an image processing apparatus including: a geographic information holding unit that holds geographic information on an installation place where the image processing apparatus is installed; a form generation unit that generates an information registration form describing items for registering information on a disaster to be collected based on the geographic information held in the geographic information holding unit; and an output unit that outputs the information registration form generated by the form generation unit.

BRIEF DESCRIPTION OF THE DRAWINGS

Exemplary embodiment (s) of the present invention will be described in detail based on the following figures, wherein:

FIG. 10 is a diagram illustrating an example of a configuration of an information registration form generated by the process for generating the information registration form (FIGS. 6 to 8);

DETAILED DESCRIPTION

Hereinafter, exemplary embodiments of the present invention will be described in detail with reference to the drawings.

Figure 1:
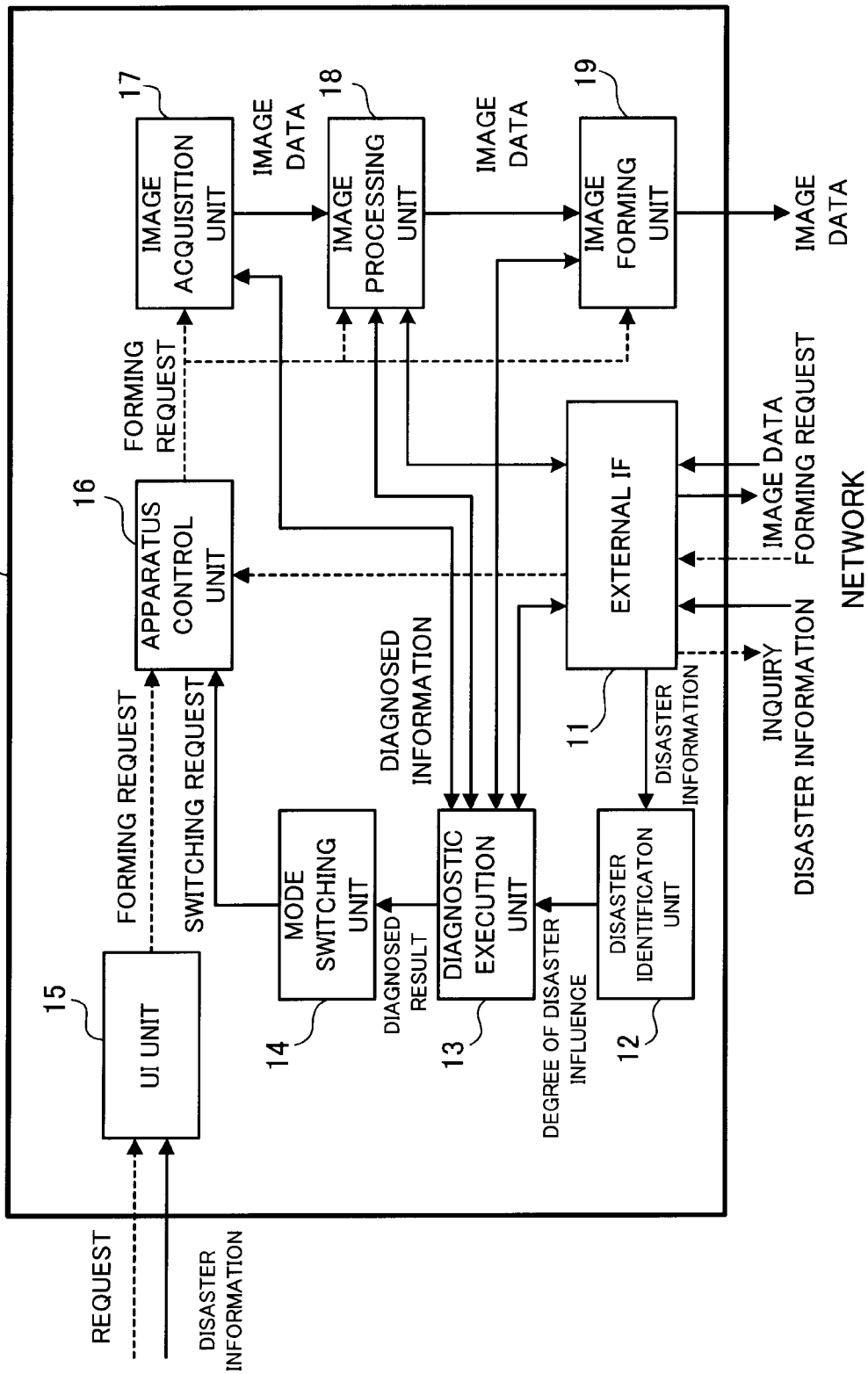
FIG. 1 is a functional block diagram illustrating an example of a configuration of an image processing apparatus.

FIG. 1 is a functional block diagram illustrating an example of a configuration of an image processing apparatus 10 to which the present exemplary embodiment is applied. As shown in FIG. 1, the image processing apparatus 10 is realized by a computer apparatus such as an embedded computer integrated with an image forming apparatus having a function as a printer, a facsimile, a copying machine or the like, a personal computer connected externally to the image forming apparatus, an embedded computer integrated with an image input apparatus having a function as a scanner or the like, or a personal computer connected externally with the image input apparatus. The image processing apparatus 10 is, for example, installed in a retail shop that deals with a variety of products in a small space, that is, so-called a convenience store or the like. The image processing apparatus 10 installed in the so-called convenience store or the like may be utilized as, for example, a printer, a facsimile, a copying machine, a scanner, an apparatus that prints out pictures taken by a digital camera, a kiosk terminal (an unattended information terminal) or the like, in a normal operational state.

Moreover, the image processing apparatus 10 has an external IF (interface) 11 that executes communication with external apparatuses, for obtaining various kinds of information from a centralized management server (not shown in figures) as a management apparatus that performs centralized management of the image processing apparatus 10 via the network. The external IF 11 is connected to the server, for example, via a LAN (Local Area Network) or the Internet. A dedicated line, a VPN (Virtual Private Network) or the like is used for connection. In addition, the image processing apparatus 10 has a disaster identification unit 12 that identifies disaster information (information on a disaster) and a diagnostic execution unit 13 that conducts diagnosis using information such as the degree of disaster influence outputted from the disaster identification unit 12. Further, the image processing apparatus 10 has a mode switching unit 14 that determines a mode candidate based on the diagnosed result outputted from the diagnostic execution unit 13 and switches the mode.

Furthermore, the image processing apparatus 10 has a user interface unit (UI unit) 15 including a presentation portion (not shown in figures), a receiving portion (not shown in figures) and an instruction specification portion (not shown in figures). The presentation portion presents information to a user (an operator). The receiving portion is configured as, for example, a position indicating device such as a mouse, a touch panel and the like, or an input device such as a keyboard, and receives operation by the user. An instruction specification portion specifies an instruction about image processing based on the operation received by the reception portion. In the UI unit 15, predetermined UI information from a UI information storage unit (not shown in figures) storing various kinds of user interface information is read and expanded.

The presentation portion included in the UI unit 15 uses a display function such as a display to visually present predetermined information to a user (including a user, a worker, an operator, a clerk of a retail store and the like) using the image processing apparatus 10. The display is realized by a VFD (vacuum fluorescent display) or a liquid crystal display (LCD), as needed. In addition to the visual presentation, voice presentation using a tone generator such as a speaker, light flashing presentation using a lamp or the like, or vibration presentation using a device that produces vibration such as a vibrator may be used.

The receiving portion is realized by, for example, a sensor that is provided on a display and that detects operation of virtual switches such as buttons displayed on the display and hardware switches, and receives operation by the user using the image processing apparatus 10. The reception portion may receive voice operation using a microphone that inputs voice or the like.

The instruction specification portion is realized, for example, through execution of a program held in a memory by a CPU (Central Processing Unit) and specifies an instruction about image processing based on the received operation.

The UI unit 15 having such a function may be installed in the image processing apparatus 10, or provided by connecting an information processing apparatus such as a cellular phone, a PDA (personal digital assistance), an electronic data book, a personal computer or the like by wired or wireless connection. Depending on circumstances, by using various input functions, information inputted from a user such as the disaster information is recognized.

Moreover, the image processing apparatus 10 shown in FIG. 1 is provided with an apparatus control unit 16 that controls the whole image processing apparatus 10. Furthermore, as various functions relating to the image processing, for example, the image processing apparatus 10 is provided with an image acquisition unit 17 that acquires image data to be processed, an image processing unit 18 that processes the image data acquired, an image forming unit 19 that outputs the image data processed. Here, the image acquisition unit 17 may preferably include a scanner that optically reads an image on a medium such as a sheet of paper, or be configured to acquire the image data through the external IF 11 from a scanner as an external apparatus. Receiving the image data from an external apparatus (a personal computer or the like) connected via a telephone line or LAN is also accepted. The image forming unit 19 may preferably include an image forming apparatus that uses, for example, an image forming method forming a toner image on a medium such as a sheet of paper by electrophotography, or an ink jet method forming an image by spraying ink onto a medium such as a sheet of paper. Moreover, the image forming unit 19 may be configured not to execute the operation in which the image is formed on a medium, and to output the image data to an external image forming apparatus connected through the external IF 11.

Figure 2:
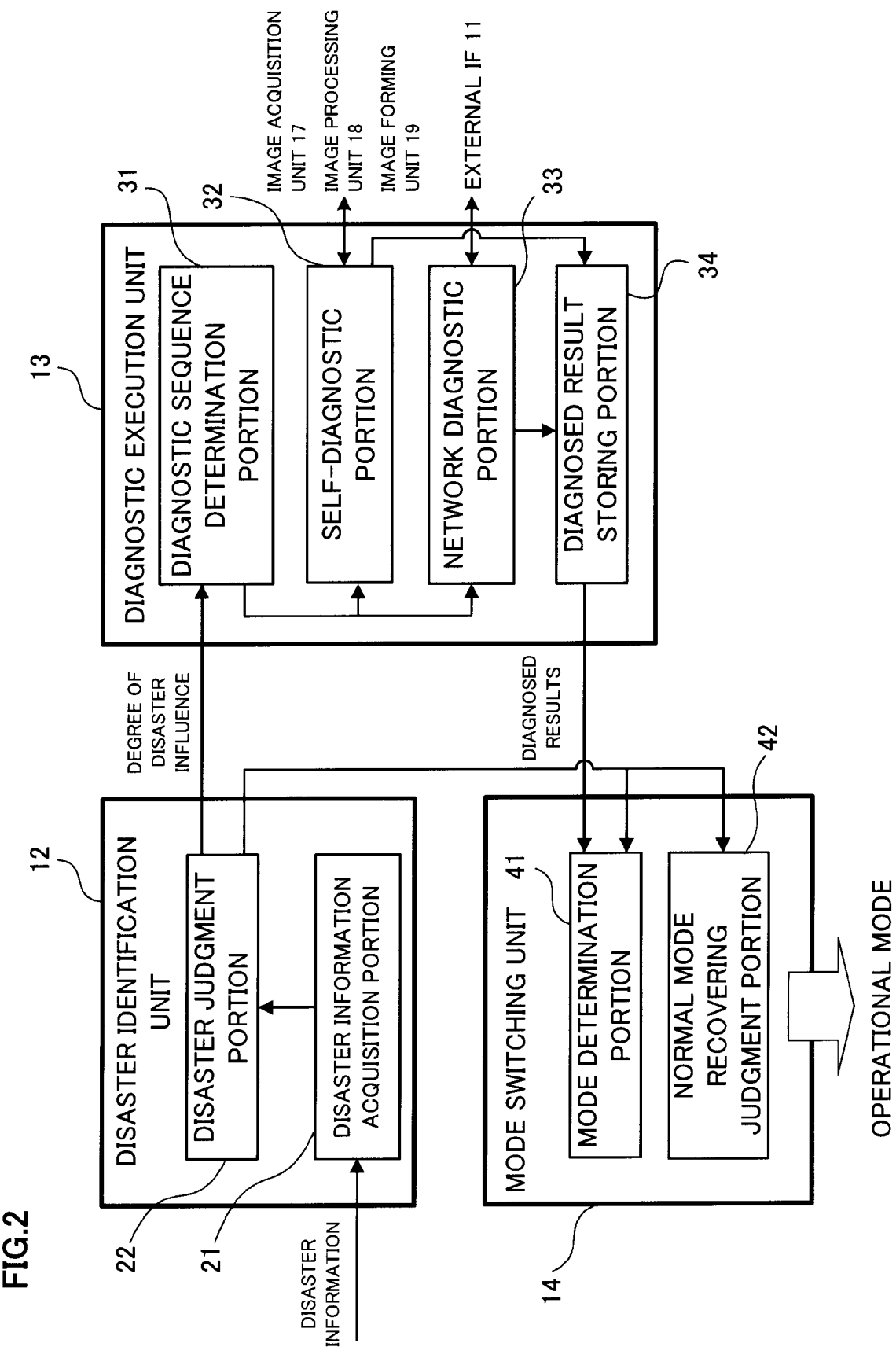
FIG. 2 is a block diagram illustrating in detail various functions of the disaster identification unit, the diagnostic execution unit and the mode switching unit shown in FIG. 1.

FIG. 2 is a block diagram illustrating in detail various functions of the disaster identification unit 12, the diagnostic execution unit 13 and the mode switching unit 14 shown in FIG. 1. The image processing apparatus 10 may be realized as an information processing apparatus including these functional blocks.

The disaster identification unit 12 is configured to include a disaster information acquisition portion 21 that acquires disaster information and a disaster judgment portion 22 that outputs the degree of disaster influence.

The disaster information acquisition portion 21 acquires disaster information based on information delivered from, for example, the centralized management server via the network. Moreover, the disaster information acquisition portion 21 may also acquire information on a disaster from an emergency warning broadcasting delivered via a public broadcasting and the like at the occurrence of the disaster, information from a disaster occurrence button operated by a user at the occurrence of the disaster and information acquired from the sensor of the disaster information acquisition portion 21 itself or a sensor directly connected thereto such as an earthquake sensor that detects vibration of an earthquake and a sensor that detects a flood. Here, types of disasters include an earthquake, a wind and flood disaster, a fire, a volcanic disaster and blackout.

The disaster judgment portion 22 performs judgment for the next diagnostic operation and moving to the disaster occurrence mode based on information from the disaster information acquisition portion 21. As the judgment, the disaster judgment portion 22 judges records of disaster information on the disaster type, time of occurrence of a disaster or the like, and by using the degree of the disaster influence on the image processing apparatus 10, whether or not the degree of the disaster influence exceeds a preset threshold value. The threshold value is preset to each image processing apparatus 10 and is stored in a nonvolatile memory such as a ROM (Read Only Memory). For example, when the degree of the disaster influence is too low, mode switching is not preferable because it is an excessive reaction. It is preferable to determine the threshold value in consideration of emergency situation and maintaining continuity of functions at the occurrence of a disaster. Based on the judged result, the diagnostic execution unit 13 and the mode switching unit 14 execute the next diagnostic operation and the process for moving to the disaster occurrence mode.

Here, there are cases in which the degree of the disaster influence is:

(i) inputted from the centralized management server or a user;
(ii) calculated from an inputted value of the earthquake sensor, a flood sensor or the like; and
(iii) calculated by the image processing apparatus 10 itself.

In particular, in the case (iii), the degree of the disaster influence is calculated based on the scale of the disaster and the approximate (rough) distance from a disaster-stricken area obtained from wide-area information such as a warning broadcasting. That is, even when the disaster scale is small, if the distance from the stricken area is short, the degree of the disaster influence on the image processing apparatus 10 is high. On the contrary, even when the disaster scale is large, if the distance from the stricken area is long, the degree of the disaster influence on the image processing apparatus 10 is low. As shown in the following equation, distance is regarded as an element to determine the degree of the disaster influence.

Degree of the disaster influence=disaster type coefficient×disaster scale×1/distance(or 1/distance squared)   equation (1)

Figure 3:
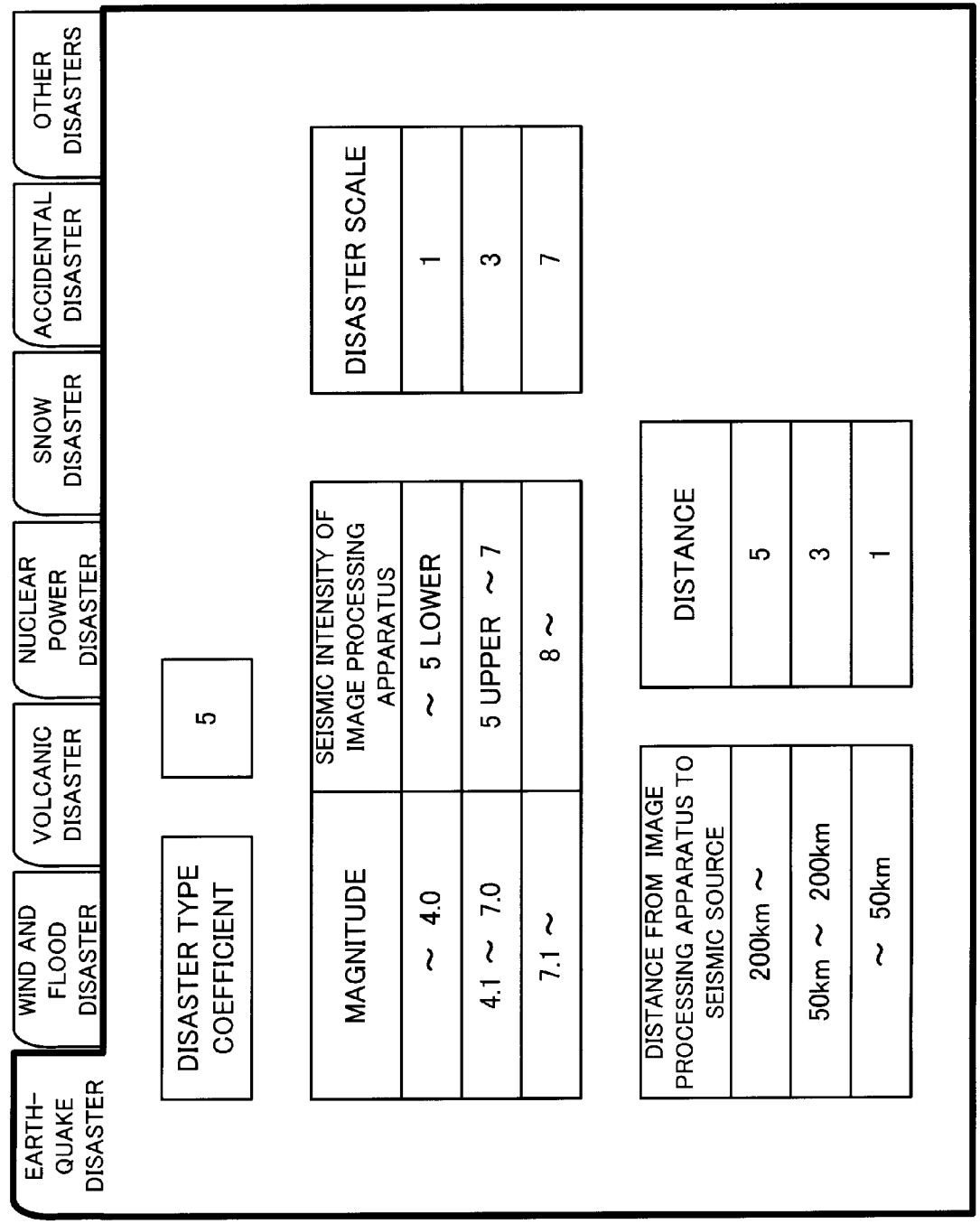
FIG. 3 is a diagram illustrating an example of a disaster type information table used for calculating the degree of the disaster influence in the disaster judgment portion.

For example, the disaster type coefficients of 1 to 5, the disaster scales of 1 to 7 and the distances of 1 to 5 are set based on information stored in a predetermined memory as shown in FIG. 3.

In addition, when the disaster information is obtained from plural input, the disaster judgment portion 22 gives priority to the one in which the degree of the disaster influence is highest.

FIG. 3 is a diagram illustrating an example of a disaster type information table used for calculating the degree of the disaster influence in the disaster judgment portion 22.

The disaster type information table is information stored in a memory such as a hard disk drive (HDD) of the image processing apparatus 10 described later. The disaster type information table is read by a CPU executing a processing program, and is temporarily stored in, for example, a RAM (Random Access Memory) that is a working memory for processing of the CPU. As shown in FIG. 3, in the disaster type information table, the information used at the time for determining value of a disaster type coefficient, value of disaster scale and value of distance for each disaster type is stored. In the example shown in FIG. 3, as the disaster types, there are an earthquake disaster, a wind and flood disaster, a volcanic disaster, a nuclear power disaster, a snow disaster, an accidental disaster and other disasters. In FIG. 3, the earthquake disaster is selected.

In the example shown in FIG. 3, the disaster type coefficient is set to "5" as an evaluation item of the earthquake disaster. Further, the disaster scale is set to "1," "3" or "7" based on the magnitude measured on the Richter scale or the seismic intensity of the image processing apparatus 10. Furthermore, the distance from the image processing apparatus 10 to the seismic source is set to "5," "3" or "1." The disaster judgment portion 22 obtains each of the values from the table information shown in FIG. 3 based on disaster information acquired by the disaster information acquisition portion 21, and calculates the degree of the disaster influence by substituting numerical values in the equation (1) described above.

As a scale of the seismic intensity, the Japan Meteorological Agency Seismic Intensity Scale is used here.

As described above, the disaster identification unit 12 executes the processing for identifying a disaster from the acquired disaster information. However, there is another aspect of disaster identification executed by the disaster identification unit 12. For example, when the image processing apparatus 10 is turned on, the disaster identification unit 12 judges whether or not the latest turning-off operation is performed in a normal manner. When the disaster identification unit 12 judges that the latest turning-off operation has not been performed in a normal manner, a UI screen (not shown in figures) of the UI unit 15 for inputting reason of the turning-off is displayed. Then, the disaster information acquisition portion 21 recognizes the user input from the UI screen of the UI unit 15. In the case of identifying a disaster, the disaster information acquisition portion 21 requires a user to input disaster information via the UI screen. Here, examples of the turning-off operation that is not performed in a normal manner include (i) a blackout, (ii) turning-off by receiving disaster information, and (iii) turning-off by detecting a disaster (for example, vibration detection).

In addition, there is also a method for acquiring disaster information by an input from a user to the UI screen of the UI unit 15 that always displays contents for checking whether or not the turning-on is a recovery from disaster occurrence when the turning-on operation is performed.

Next, a description will be given to the diagnostic execution unit 13. As shown in FIG. 2, the diagnostic execution unit 13 has a diagnostic sequence determination portion 31 and a self diagnostic portion 32. The diagnostic sequence determination portion 31 determines diagnosis to be conducted by using information on the degree of the disaster influence from the disaster identification unit 12. The self diagnostic portion 32 conducts diagnosis on the body of the image processing apparatus 10. In addition, the diagnostic execution unit 13 has a network diagnostic portion 33 and a diagnosed result storing portion 34. The network diagnostic portion 33 conducts diagnosis on an external communication network such as the Internet connection, a telephone line or the like. The diagnosed result storing portion 34 stores the diagnosed result of the network and the image processing apparatus 10 in a memory. Further, the diagnosed result storing portion 34 may be configured to be included in the mode switching unit 14.

The diagnostic execution unit 13 generally conducts diagnosis on the body of the image processing apparatus 10 when the turning-on operation is performed. In addition to this, in the present exemplary embodiment, the diagnostic contents are changed based on information on the degree of the disaster influence judged by the disaster identification unit 12.

That is, the diagnostic sequence determination portion 31 prepares plural diagnostic sequences (the predetermined sequences of operation for diagnosis) and determines the sequence according to the disaster type, the distance from a disaster-stricken area and the degree of the disaster influence. For example, in the case of a flood, the diagnostic sequence determination portion 31 diagnoses whether or not the paper feed from all sheet trays is available. In the case of a large-scale blackout, on a timely basis, the diagnostic sequence determination portion 31 checks the stability of electrical supply from a power source and diagnoses whether or not communication with an external server is available as a diagnosis on the network. In this way, in order to realize, for example, proper diagnosis and/or prompt diagnosis more satisfactorily, self diagnosis and diagnosis on network environment are executed according to the acquired disaster information. That is, diagnostic execution corresponding to disaster information, such as picking up the diagnostic items, focusing on the diagnostic items, and diagnosis on particular items that is not performed in diagnosis in the normal mode, is realized.

The self diagnostic portion 32 diagnoses respective sub-systems (not shown in figures) of an image acquisition unit 17, an image processing unit 18 and an image forming unit 19 included in the image processing apparatus 10. For example, the image acquisition unit 17 has sub-systems such as an illumination system, imaging optics, a photoelectric transducer and an automatic document feed portion, and diagnoses for each of them are performed. Further, the image processing unit 18 has sub-systems such as an HDD and the like, and diagnoses for each of them are performed. Furthermore, as for the image forming unit 19, diagnoses are performed for its sub-systems such as an charging portion, an exposure portion, a development portion (in the case of an apparatus forming a color image, development portions for C (cyan), M (magenta), Y (yellow) and K (black)), a transfer portion, a fixing portion and a paper feed portion (a sheet tray).

Next, the network diagnostic portion 33 diagnoses communication with an external network. Specifically, the network diagnostic portion 33 examines the status of a communication line connected to the image processing apparatus 10, such as an Internet connection (via LAN) and a telephone line, by testing whether communication with the centralized management server is available or communication with a external image processing apparatus is available. The diagnosed result storing portion 34 stores the diagnosed result of the self diagnostic portion 32 and the network diagnostic portion 33 in a predetermined memory, and outputs it to the mode switching unit 14.

Next, a description will be given to the mode switching unit 14. As shown in FIG. 2, the mode switching unit 14 has a mode determination portion 41 and a normal mode recovering judgment portion 42. The mode determination portion 41 determines a used mode candidate based on the outputted result from the diagnostic execution unit 13 and the disaster identification unit 12. The normal mode recovering judgment portion 42 judges recovery to the normal mode. Examples of the operational modes determined by the mode determination portion 41 are, as disaster occurrence modes, (i) a safety mode and (ii) a function limit mode. As an operational mode in a normal operation state without disaster occurrence, there is (iii) a normal operational mode.

The safety mode as an example of the disaster occurrence modes is an operational mode for continuing the service of the image processing apparatus 10 longer than that in the normal operational mode. The specific operation includes power supply stop and access prohibition to the HDD for information protection, reduction in toner consumption, suppression of color image formation for saving energy, lowering of a fixing temperature, lowering of voltage for charging, and decrease in the brightness of a liquid crystal backlight. In addition, a counter that counts the number of processed documents after moving to the safety mode is different from the counter that is used in a normal mode.

The function limit mode as another example of the disaster occurrence modes is an operational mode used in the case that a part of the sub-systems is diagnosed as being failed. The function limit mode performs operation by using an undamaged part without stopping all operations due to some errors. For example, in the case that the image reading unit (not shown in figures) is failed and is lack of ability to read an image, the function limit mode performs operation limited to printer outputting. On the other hand, in the case that the paper carrying system (not shown in figures) is failed, and that the image reading unit and the communication unit (not shown in figures) are normal, the function limit mode may perform facsimile transmission using the image reading unit and data communication. Further, in case of communication with the external network being cut off, image processing apparatus 10 may have a function as a stand-alone apparatus.

Now, in the present exemplary embodiment, assume a case that the image processing apparatus 10 is installed in a company or a store such as a so-called convenience store, and the image processing apparatus 10 is used to realize collection of safety information on employees of the company or the store and residents in the neighborhood of the store. As its method, a medium (for example, a sheet of paper) on which a particular form for filling in safety information and the like is formed is outputted and the information filled in the form is read so that desired information is collected. The collected information is transmitted to the centralized management server. Hereinafter, a description will be given to the configuration for realizing the method.

In the present exemplary embodiment, when disaster information is acquired by the disaster identification unit 12, the image processing apparatus 10 starts the function for collecting information according to the place (site of the company or store) in which the image processing apparatus 10 is installed.

Figure 4:
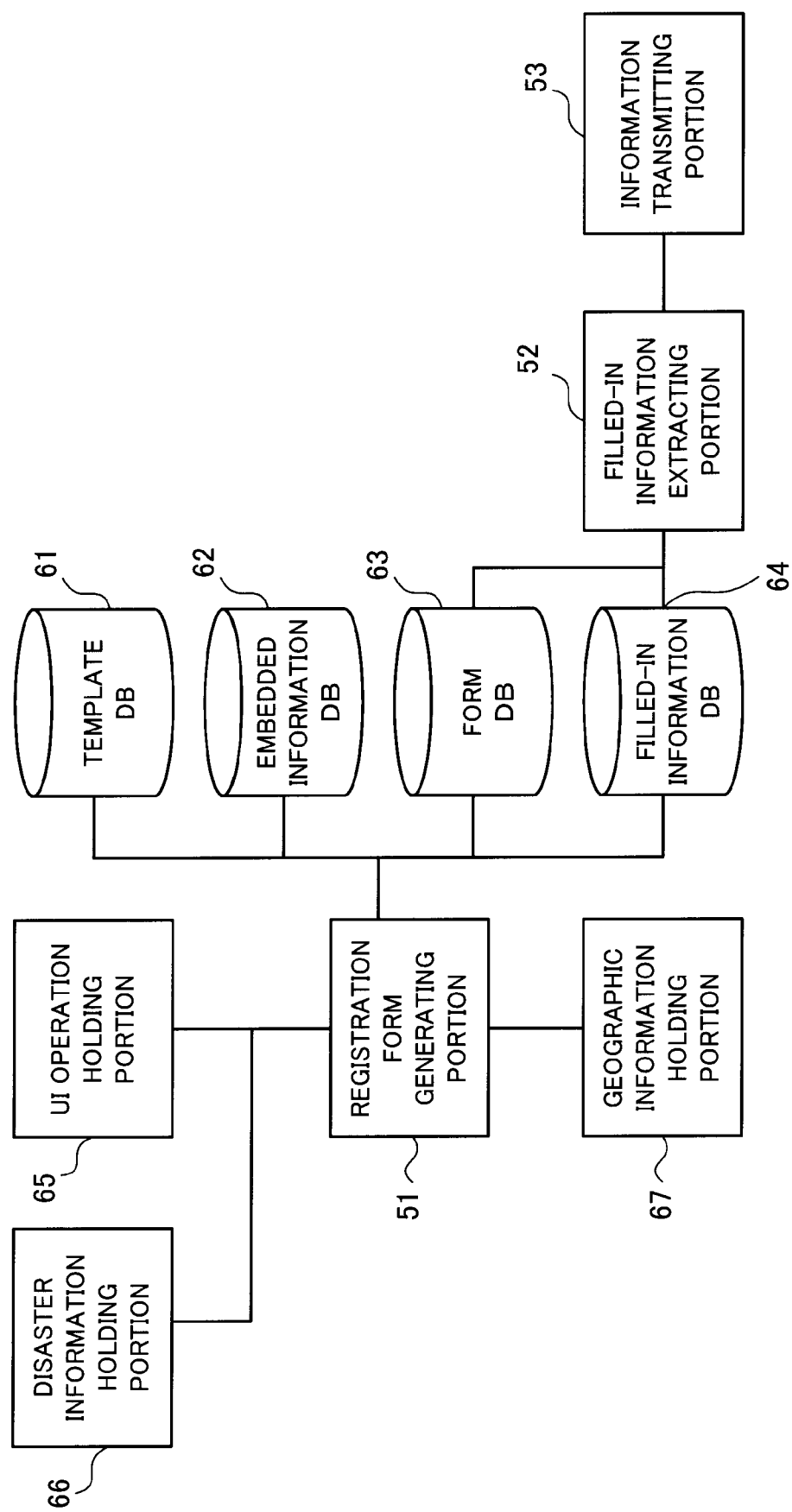
FIG. 4 is a block diagram illustrating in detail the function of the apparatus control unit at the occurrence of a disaster.

FIG. 4 is a block diagram illustrating in detail the function of the apparatus control unit 16 at the occurrence of a disaster in the present exemplary embodiment.

The apparatus control unit 16 shown in FIG. 4 has a registration form generating portion 51, a filled-in information extracting portion 52 and an information transmitting portion 53. The registration form generating portion 51 generates an information registration form. The filled-in information extracting portion 52 extracts information filled in the form. The information transmitting portion 53 transmits the extracted information to the centralized management server.

Further, the apparatus control unit 16 has a template database (a template DB) 61 and an embedded information database (an embedded information DB) 62 which are used for generating a form, a form database (a form DB) 63 for registering the generated form, and a filled-in information database (a filled-in information DB) 64 for registering information extracted by the filled-in information extracting portion 52. In addition, the apparatus control unit 16 has a UI operation holding portion 65 and a disaster information holding portion 66. The UI operation holding portion 65 holds the contents of user operation received by the UI unit 15. The disaster information holding portion 66 holds disaster information acquired by the disaster identification unit 12. Furthermore, the apparatus control unit 16 has a geographic information holding portion 67 that holds geographic information (an address) on the place where the image processing apparatus 10 is installed.

The template DB 61 is realized by a nonvolatile memory such as a ROM or a magnetic disk drive and holds a template as template information that specifies the format (layout and the like) of a form. Plural types of templates are prepared according to information on the type of a disaster, disaster scale, a collected target and the like. The suitable template is read and used based on information on the type of the disaster, the disaster scale and the like identified by the disaster identification unit 12.

The embedded information DB 62 is realized by a nonvolatile memory such as a ROM and a magnetic disk drive and holds information added to the template for generating the form. Specifically, the embedded information DB 62 holds information on reregistered items, such as information on each person whose safety is to be checked (for example, name), the installation place where the image processing apparatus 10 is installed, selections in each item, a neighboring evacuation place, a dangerous area, a map (image) of these places.

The form DB 63 is realized by a nonvolatile memory such as a ROM and a magnetic disk drive and holds the form generated by the registration form generating portion 51. When the filled-in information extracting portion 52 extracts information filled in the form, the form is used for detecting the filled-in part.

The filled-in information DB 64 is realized by a nonvolatile memory such as a ROM and a magnetic disk drive and holds the information extracted by the filled-in information extracting portion 52. The information may be updated according to change in a disaster state with an elapsed time or the like.

The UI operation holding portion 65 and the disaster information holding portion 66 are realized by readable and writable memories such as RAMs or the like. Information held in these memories are used for selecting a template for generating the form and used for determining information embedded into the selected template.

The geographic information holding portion 67 is realized by a nonvolatile memory such as a ROM or a magnetic disk drive and holds geographic information (an address) on the installation place where the image processing apparatus 10 is installed. The geographic information is registered when the image processing apparatus 10 is installed in a so-called convenience store or the like. Then the geographic information is used for determining information embedded into a template when a form is generated.

The registration form generating portion 51 is realized by a program controlled CPU. The registration form generating portion 51 generates a registration form of safety information and the like, and instructs to output them from the image forming unit 19. In the present exemplary embodiment, the generated form is changed according to the installation place where the image processing apparatus 10 is installed. The detail of the form generating process will be described later.

The filled-in information extracting portion 52 is realized by a program controlled CPU and extracts filled-in information from the image of the filled-in form inputted via the external IF 11 and the image acquisition unit 17. The detail of the information extracting process will be described later.

The information transmitting portion 53 is realized by a program controlled CPU and accesses the centralized management server via the external IF 11. Then, the information extracted by the filled-in information extracting portion 52 is transmitted to the centralized management server.

Next, the description will be given to the operation in the present exemplary embodiment.

Figure 5:
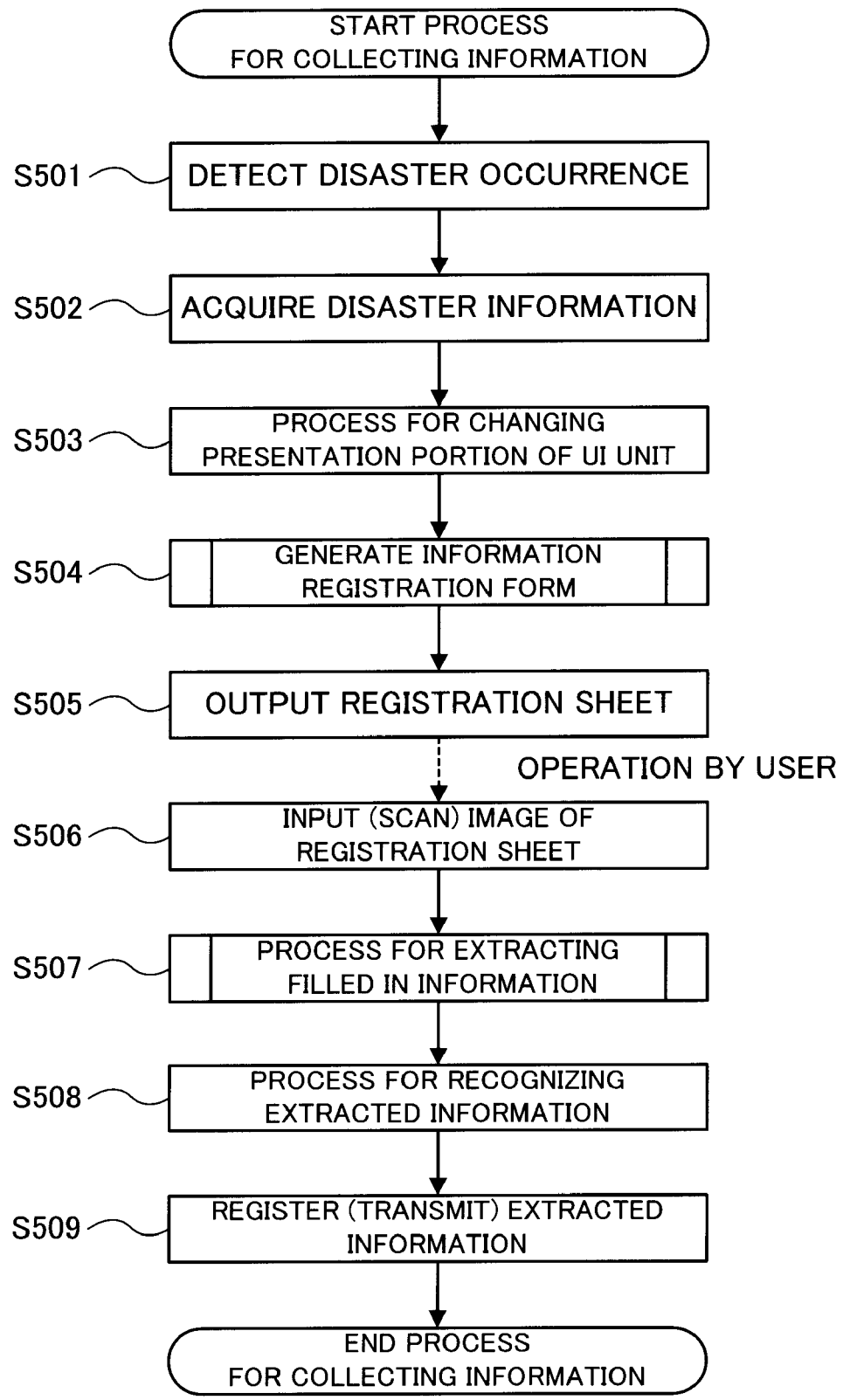
FIG. 5 is a flowchart illustrating an entire flow of operation for collecting information by detecting disaster occurrence.

FIG. 5 is a flowchart illustrating an entire flow of operation for collecting information by detecting disaster occurrence.

As shown in FIG. 5, disaster occurrence is detected by the sensor of the image processing apparatus 10, notification from the centralized management server or the like (step 501), and the disaster information is acquired by the disaster identification unit 12 (step 502). Accordingly, the image processing apparatus 10 is moved to the disaster occurrence mode. The display of the presentation portion of the UI unit 15 is changed, and output preparation of an information registration form is completed (step 503).

When an output instruction of the information registration form is inputted, the registration form generating portion 51 of the apparatus control unit 16 performs the process for generating the information registration form (step 504). The image forming unit 19 forms an image on a medium such as a sheet of paper based on the outputted information registration form and outputs the image as a registration sheet (step 505). The detail of the process for generating the information registration form will be described later. A user fills in information in the registration sheet and inputs the image of the registration sheet by using a scanner or the like (step 506). The inputted image is transmitted via the image acquisition unit 17 to the filled-in information extracting portion 52.

The filled-in information extracting portion 52 of the image processing apparatus 10 performs the process for extracting the information filled in by the user from the image of the inputted registration sheet (step 507), and performs the process for recognizing the extracted information (step 508). The detail of the information extracting process will be described later.

Thereafter, the information transmitting portion 53 transmits the information (registered information) extracted and recognized by the filled-in information extracting portion 52 via the external IF 11 to the centralized management server (step 509). The centralized management server, for example, collects registered information transmitted from image processing apparatuses 10 in various places and registers the information into the database to be provided in order to check and analyze the entire damage information of the disaster.

Figure 6:
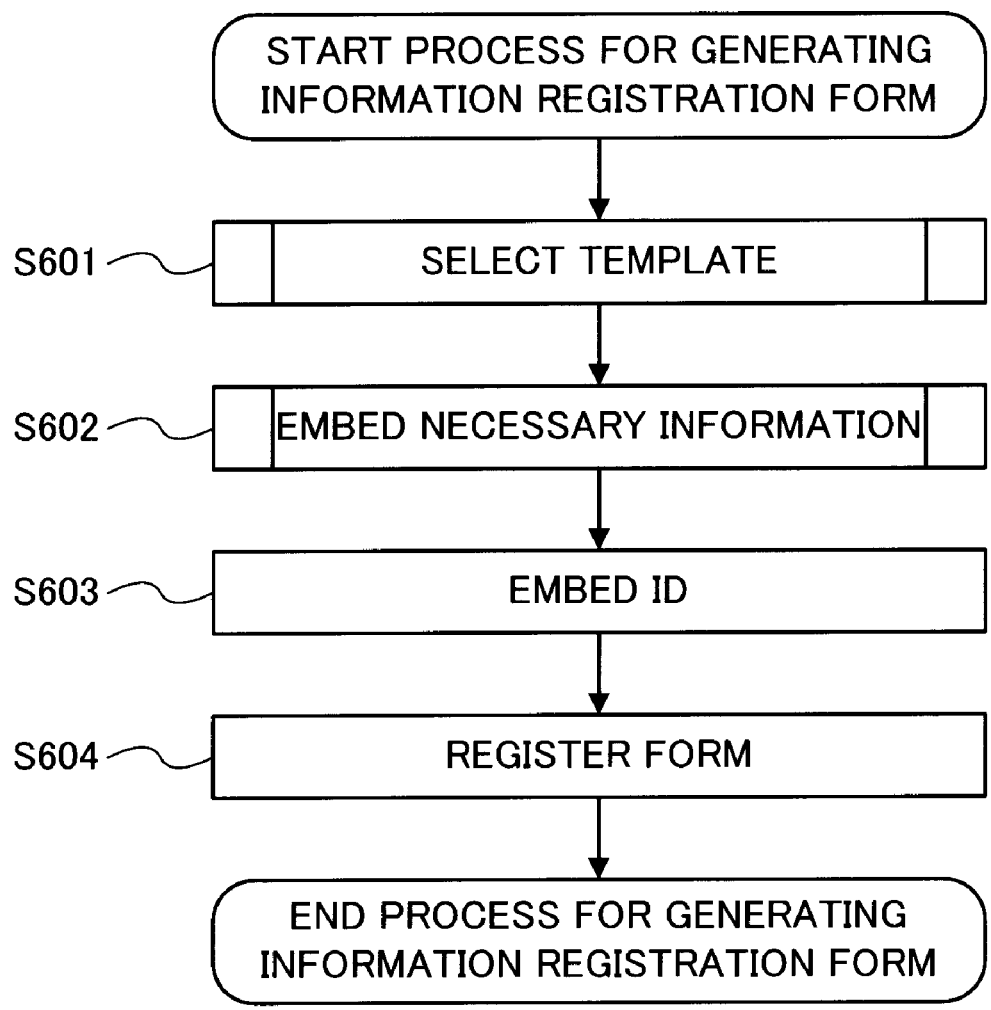
FIG. 6 is a flowchart illustrating in detail the process for generating the information registration form shown in step 504 of FIG. 5.

FIG. 6 is a flowchart illustrating in detail the process for generating the information registration form shown in step 504 of FIG. 5.

In this process, firstly the registration form generating portion 51 selects a template for determining the type of a form based on specifying the form by a user and information on the type of a disaster, disaster scale and other disaster states (step 601). In addition, necessary information is embedded into the template based on the geographic information on the installation place where the image processing apparatus 10 is installed to generate the form (step 602). As for the template selection and embedded information, information to be collected may be considered to be determined according to request from a precedence organization such as an administrative organization. The detail of these processes will be described later.

Thereafter, the registration form generating portion 51 embeds an ID into the generated form (step 603) and registers the form into the form DB 63 (step 604).

Figure 7:
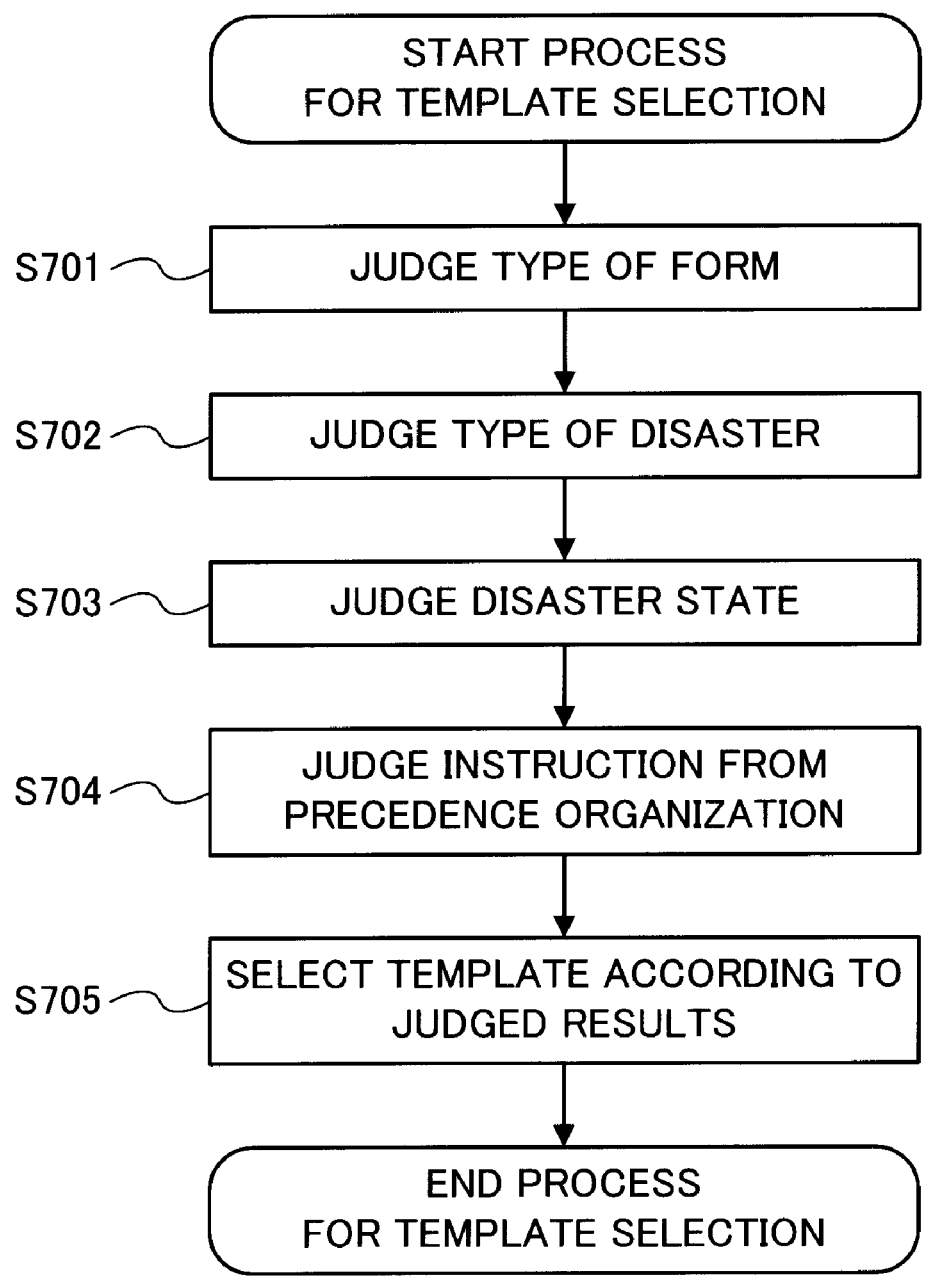
FIG. 7 is a flowchart illustrating in detail the process for the template selection shown in step 601 of FIG. 6.

FIG. 7 is a flowchart illustrating in detail the process for the template selection shown in step 601 of FIG. 6.

The registration form generating portion 51 firstly judges the type of a form specified by the user based on operative information stored in the UI operation holding portion 65 (step 701). The registration form generating portion 51 also judges the type of a disaster and the disaster state based on the disaster information stored in the disaster information holding portion 66 (steps 702 and 703). Specifically, the registration form generating portion 51 judges the type of a disaster, such as an earthquake, a wind and flood disaster, a volcanic disaster or a landslide disaster. Further, the registration form generating portion 51 judges the disaster state such as the disaster scale, the distance from the disaster-stricken area and the like. The registration form generating portion 51 also judges whether or not an instruction about information to be collected is received from the precedence organization such as an administrative organization (step 704). The instruction is to be received via the external IF 11 and is to be held in a memory such as a RAM. In addition, the registration form generating portion 51 selects the suitable template from templates stored in the template DB 61 according to these judged results and reads the template (step 705). Then, the process ends.

Figure 8:
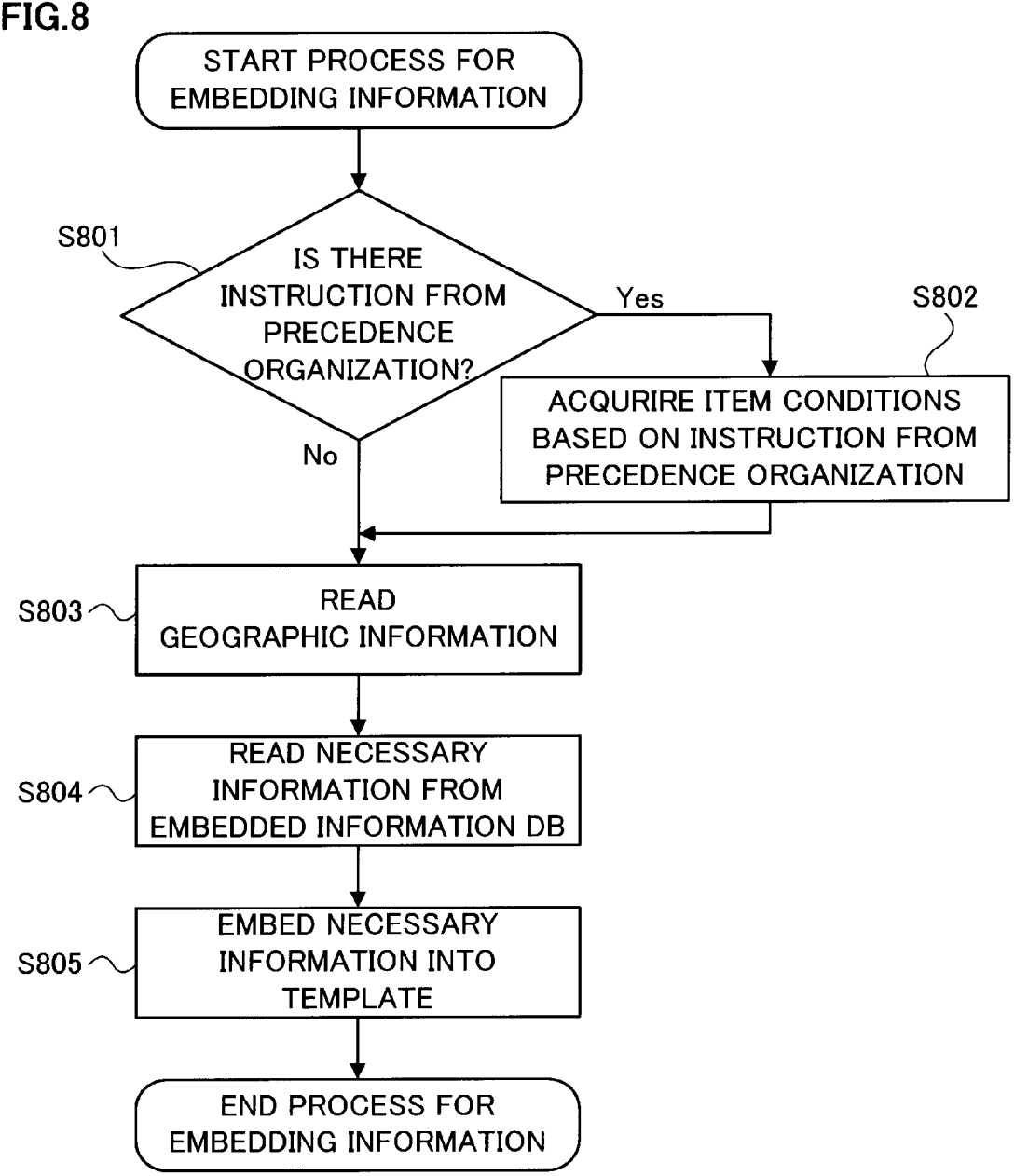
FIG. 8 is a flowchart illustrating in detail the process for embedding information into the template shown in step 602 of FIG. 6.

FIG. 8 is a flowchart illustrating in detail the process for embedding information into the template shown in step 602 of FIG. 6.

The registration form generating portion 51 firstly reads the template in step 601 (for more detailed information, see FIG. 7) and then judges whether or not a particular instruction is received from the precedence organization such as an administrative organization or a company (step 801). As described above, the instruction is received via the external IF 11 and is held in a memory such as a RAM. When there is an instruction from the precedence organization, item conditions of necessary embedded information are acquired based on the instruction (step 802). In addition, other items set in the selected template are equal to the items of the embedded information.

Next, the registration form generating portion 51 reads geographic information on the installation place where the image processing apparatus 10 is installed from the geographic information holding portion 67 (step 803). The registration form generating portion 51 also reads necessary information from the embedded information DB 62 according to the items and conditions determined in steps 801 and 802 and the geographic information (step 804). In addition, the registration form generating portion 51 embeds the geographic information read in step 803, the information estimated from the geographic information and the information read in step 804 into the corresponding locations of the template read in step 601 of FIG. 6 (for more detailed information, see FIG. 7) (step 805). Then, the process ends.

As described above, the geographic information holding portion 67 has a function as a geographic information holding unit and the registration form generating portion 51 has a function as a form generation unit. In addition, the image forming unit 19 has a function as an output unit, the disaster identification unit 12 has a function as an acquisition unit that acquires disaster information, and the template DB 61 has a function as a template holding unit that holds the template of an information registration form. Further, the filled-in information extracting portion 52 has a function as an information recognition unit, the image acquisition unit 17 has a function as a reading unit, and the information transmitting portion 53 has a function as a transmission unit.

Figure 9:
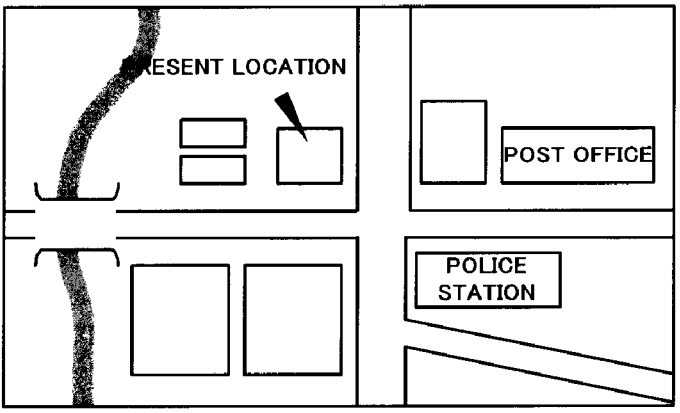
FIG. 9 is a diagram illustrating an example of a configuration of an information registration form generated by the process for generating the information registration form (FIGS. 6 to 8)

FIGS. 9 and 10 are diagrams illustrating examples of configurations of information registration forms generated by the process for generating the information registration form (FIGS. 6 to 8) as described above.

The information registration forms shown in FIGS. 9 and 10 are registration forms of damage information. FIG. 9 is an example of a form based on geographic information "xx town, xx county, Kanagawa prefecture." FIG. 10 is an example of a form based on geographic information "xx town, xxx ward, Tokyo." In the examples shown in FIGS. 9 and 10, the items of "1. Name of person who fills in this form," "2. Address," "3. Type of damage," "4. Place of damage" and "5. Miscellaneous notes" for freely filling in a message are provided. In addition, a map including an obtained address is presented in "4. Place of damage."

Although not particularly shown in figures, dangerous places in a surrounding area of the installation place where the image processing apparatus 10 is installed may preferably be listed and presented. The dangerous places are considered to be different depending on a type of a disaster. For example, it is considered that there is no great danger in riverside areas or seaside areas in the case of a fire, but a heavy damage due to tsunami, a bank rip or the like may occur in the case of an earthquake. Then, dangerous places specified based on the geographic information on the installation place where the image processing apparatus 10 is installed and the type of a disaster are presented. In this case, for the dangerous places, a table or the like corresponding to the geographic information and the type of a disaster may preferably be prepared, and the dangerous places corresponding to conditions may preferably be presented.

Comparing FIG. 9 with FIG. 10, the geographic information "xx town, xx county, Kanagawa prefecture" is embedded as an address into the information registration form shown in FIG. 9. From the geographic information, it is also found that there are a river and a bridge thereover in the surrounding area of the installation place. A damage caused by these geographic conditions is considered to occur in the case of disaster. The selections of "Bank rip," "Bridge fallen," "Severed road" and the like are embedded into "3. Type of disaster." On the other hand, the geographic information "xx town, xx ward, Tokyo" is embedded as an address into the information registration form shown in FIG. 10. From the geographic information, it is also found that the surrounding area of the installation place is a plant area along a bay and that there is a railway nearby. A damage caused by these geographic conditions is considered to occur in the case of disaster. Then, the selections of "Tsunami," "Subsidence," "Fire in tank," "Fire in plant" and "Derailment" are embedded into "3. Type of damage." In addition, a map including the address of geographic information is presented in "4. Place of damage" of the registration form shown in each figure, respectively.

In the present exemplary embodiment, in addition to the examples (registration forms of safety information) shown in FIGS. 9 and 10, various information registration forms are generated from combination of the template and the embedded information which are selected as appropriate. Information estimated based on information on the type and conditions of a disaster is embedded into each item as appropriate.

Figure 11:
FIG. 11 is an example of a registration form of safety information.

FIG. 11 is an example of a registration form of safety information. In the example shown in FIG. 11, the items of "1. Name," "2. Address," "3. Safety," "4. Damage of home," "5. Damage of lifeline," "6. Current location" and "7. Miscellaneous notes" are provided. Geographic information (here, "xx town, xx ward, Tokyo") is also embedded as an address into the information registration form. In addition, the selections of "Elementary School established by xx town" and "Junior High School established by xx town" as evacuation places estimated from the geographic information are embedded into "6. Current location." Further, part of the address, "xx town, xxx ward" is also embedded into the selection where the other location is filled in.

Figure 12:
FIG. 12 is an example of a registration form of necessary supplies.

FIG. 12 is an example of a registration form of necessary supplies. In the example shown in FIG. 12, the items of "1. Type of supplies," "2. Amount of necessary supplies," "3. Place requiring supplies," and "4. Miscellaneous notes" are provided. The selections of "Elementary School established by xx town," "Junior High School established by xx town" and "Gymnasium established by xxx ward" as evacuation places estimated from geographic information and the selection of "xx branch of xx Convenience store" as the installation place where the image processing apparatus 10 is installed are embedded into "3. Place requiring supplies" of the information registration form. In addition, part of the address "xx town, xx county" is also embedded into the selection where the other location is filled in.

As described above, in the present exemplary embodiment, the template and the embedded information are combined with each other and information estimated based on geographic information on the installation place where the image processing apparatus 10 is installed and information on the type of disaster and the like is embedded as appropriate so as to generate various information registration forms. An identification code (ID) for identifying each information registration form or a registration sheet that is a printout of the information registration form is embedded into a particular position (the upper right side in the example shown in FIG. 12) of these information registration forms. The identification code is embedded by using any method. For example, an optional code image such as a barcode or a QR code may be used.

Figure 13:
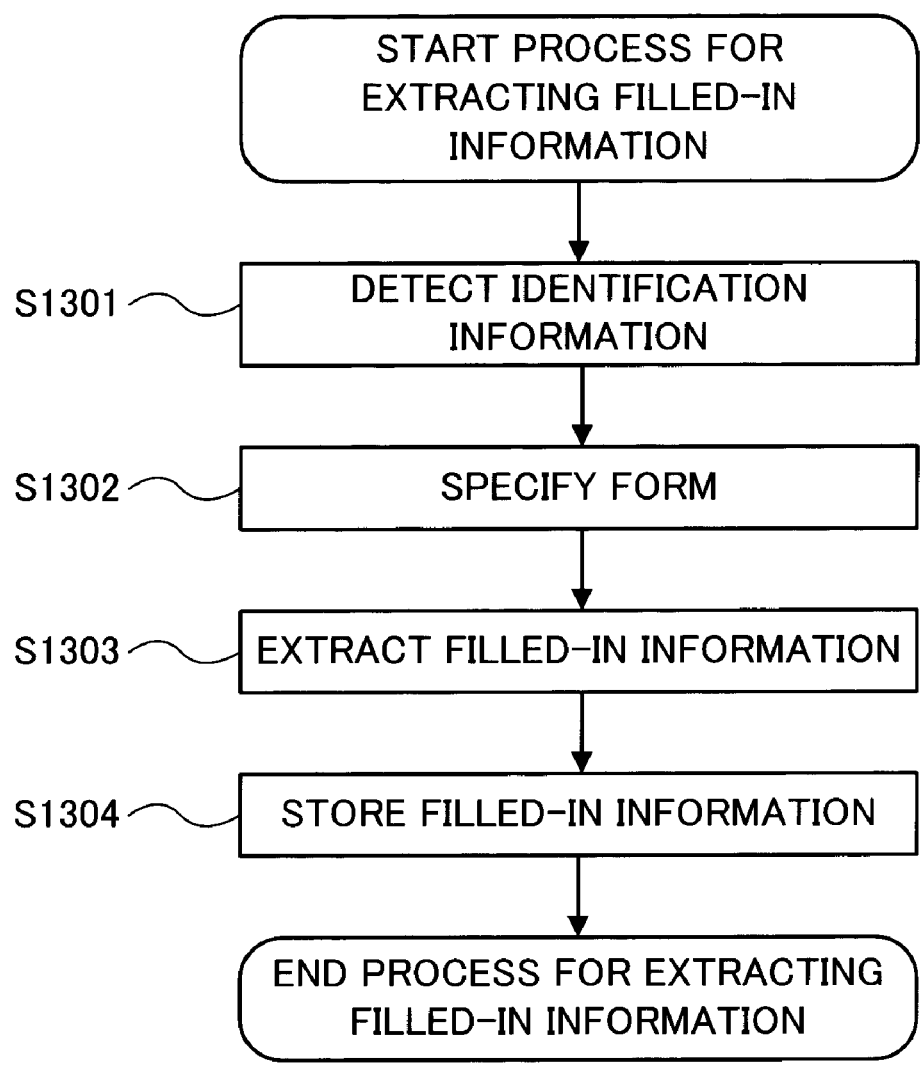
FIG. 13 is a flowchart illustrating in detail the process for extracting filled-in information shown in step 507 of FIG. 5.

FIG. 13 is a flowchart illustrating in detail the process for extracting filled-in information shown in step 507 of FIG. 5.

In this process, firstly the filled-in information extracting portion 52 detects identification information embedded into a particular position from the read image of a registration sheet (step 1301) and specifies the form of the identification sheet (step 1302). Further, the filled-in information extracting portion 52 reads the specified form from the form DB 63 and compares the form with the read image. Then, the filled-in information extracting position 52 extracts filled-in information written by a user (step 1303). Specifically, the selected portion from the selections in the items of safety information and the like, the amount of necessary supplies and the like are extracted. Furthermore, the filled-in information extracting portion 52 registers the extracted filled-in information into the filled-in information DB 64 and store the information (step 1304).

Next, in the step 508 of FIG. 5, the extracted filled-in information is used to specify the selected portion from the marked position and recognize characters such as a name, an address and a numerical value of an amount.

As described above, the filled-in information extracting portion 52 has a function as a receiving unit or a filled-in information extracting unit.

Finally, a description will be given to a hardware configuration on a part having a function as a computer in the image processing apparatus 10.

Figure 14:
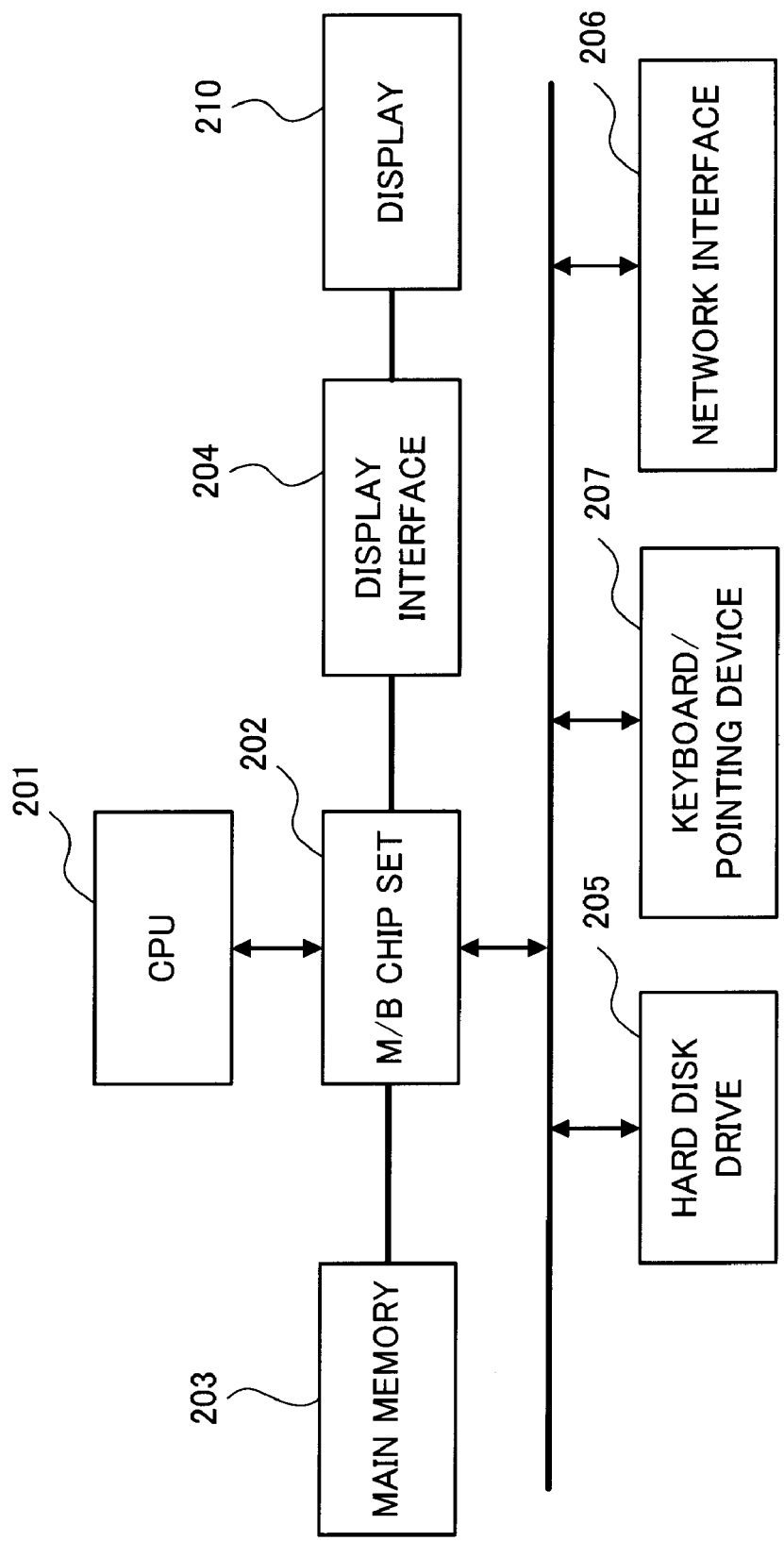
FIG. 14 is a diagram illustrating the hardware configuration on the part having a function as the computer in the image processing apparatus.

FIG. 14 is a diagram illustrating the hardware configuration on the part having a function, for example, as the computer in the image processing apparatus 10. The computer shown in FIG. 14 is provided with a CPU (Central Processing Unit) 201 that is a computing unit, a motherboard (M/B) chip set 202 and a main memory 203 that is connected to the CPU 201 through a system bus. Moreover, through the M/B chip set 202, a display interface 204 and a display 210 are connected to the CPU 201. Further, the computer is provided with a hard disk drive (HDD) 205 that is connected to the M/B chip set 202 through an input and output bus, a network interface 206 and a keyboard/pointing device 207. For example, as the display interface 204, a video card including a graphic processor is preferably used.

Here, the CPU 201 executes various kinds of software such as OS (Operating System) and applications, and realizes the various functions described above. In addition, the main memory 203 has a function as the working memory having a memory area that stores the various kinds of software and data to be used for executing the software and the like. Further, the hard disk drive 205 is a memory provided with a memory area that stores input data to the various kinds of software, output data from the various kinds of software and the like. Moreover, there is a case in which instead of the hard disk drive 205, a semiconductor memory represented by a flash memory or the like is used.

As described above, the various processes shown in the present exemplary embodiment are realized through application programs executed by the CPU 201, with the main memory 203 that is the working memory. The application programs may be provided in a state in which the application programs are installed in the image processing apparatus 10 when the image processing apparatus 10 as a computer is provided to a customer (including a user). The application programs may also be provided by a computer readable medium or the like, which stores the programs to be executed by the computer, as a computer readable medium. The programs may be provided, for example, through a network by a program transmission apparatus (not shown in figures) such as a centralized management server and through the network interface 206.

In the present exemplary embodiment, an apparatus that generates an information registration form to output a registration sheet and an apparatus that reads a filled-in registration sheet to extract filled-in information are explained as the same apparatus. However, these may be executed by separate apparatuses. That is, the registration sheet is outputted from a predetermined image processing apparatus 10, and filled-in information is extracted by another image processing apparatus 10. Further, an apparatus having the registration form generating portion 51 and another apparatus having the filled-in information extracting portion 52 and the information transmitting portion 53 may be prepared, and the former apparatus may output the registration sheet and the latter apparatus may extract filled-in information.

In the present exemplary embodiment, the registration sheet based on the information registration form is outputted, and the image of the filled-in registration sheet in which information is filled in is read so as to extract the filled-in information. However, it may be configured to collect the information in such a manner that the information registration form is displayed on the presentation portion of the UI unit 15 to receive user operation from the receiving unit as an input to the form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a geographic information holding unit that holds geographic information on a geographic location where the image processing apparatus is installed;
    a form generation unit that generates an information registration form, the form containing fields for entering information about a disaster, the fields in the form generated based on the geographic information held in the geographic information holding unit; and
    an output unit that outputs the information registration form generated by the form generation unit.

2. The image processing apparatus according to claim 1, further comprising:
    an acquisition unit that acquires disaster information about the disaster; and
    a template holding unit that stores a template of the information registration form,
    wherein the form generation unit selects and reads the template of the information registration form stored in the template holding unit based on the disaster information acquired by the acquisition unit and generates the fields in the form based on the geographic information and the disaster information to generate the information registration form.

3. The image processing apparatus according to claim 2, wherein the form generation unit adds a map of a surrounding area of the installation place to the template of the information registration form based on the disaster information and the geographic information.

4. The image processing apparatus according to claim 2, wherein the form generation unit adds information indicating an evacuation place in a surrounding area of the installation place to the template of the information registration form based on the disaster information and the geographic information.

5. The image processing apparatus according to claim 2, wherein the form generation unit adds information indicating a dangerous place in a surrounding area of the disaster to the template of the information registration form based on the disaster information and the geographic information.

6. The image processing apparatus according to claim 1, further comprising:
    a reading unit reading a filled-in registration image in which information in the fields of the information registration form are filled in the information registration form;

an information recognition unit that extracts the information in the fields of the image registration form from the filled-in registration image read by the reading unit; and a transmission unit that transmits the information recognized by the information recognition unit to a registration server.

7. An image processing method comprising:

generating an information registration form, the form containing fields for entering information about a disaster, the fields in the form generated based on geographic information on a geographic location of an installation place where an image processing apparatus is installed; and outputting the generated information registration form.

8. A computer readable medium storing a program causing a computer to execute a process for image processing, the process comprising:

acquiring disaster information about a disaster; and generating an information registration form, the form containing fields for entering information about a disaster, the fields in the form generated based on geographic information on a geographic location of an installation place where an image processing apparatus is installed.

9. The computer readable medium according to claim 8, wherein the process further comprises:

obtaining a template of the information registration form based on the acquired disaster information; and wherein the generating comprises generating the fields based on the geographic information and the disaster information to generate the information registration form.

10. The computer readable medium according to claim 9, wherein the process further comprises:

adding a map of a surrounding area of the installation place to the template of the information registration form based on the disaster information and the geographic information.

11. The computer readable medium according to claim 9, wherein the process further comprises:

adding information indicating an evacuation place in a surrounding area of the installation place to the template of the information registration form based on the disaster information and the geographic information.

12. The computer readable medium according to claim 9, wherein the process further comprises:

adding information indicating a dangerous place in a surrounding area of the disaster to the template of the information registration form based on the disaster information and the geographic information.

13. The computer readable medium according to claim 8, wherein the process further comprises:

extracting information in the fields of the information registration form from a filled-in registration image obtained by reading the information registration form in which the fields are filled in; and transmitting the recognized information to a registration server.

* * * * *